May 28, 1929.  C. McL. MOSS  1,714,722
ELECTRICAL DISTRIBUTION SYSTEM
Filed Jan. 16, 1924
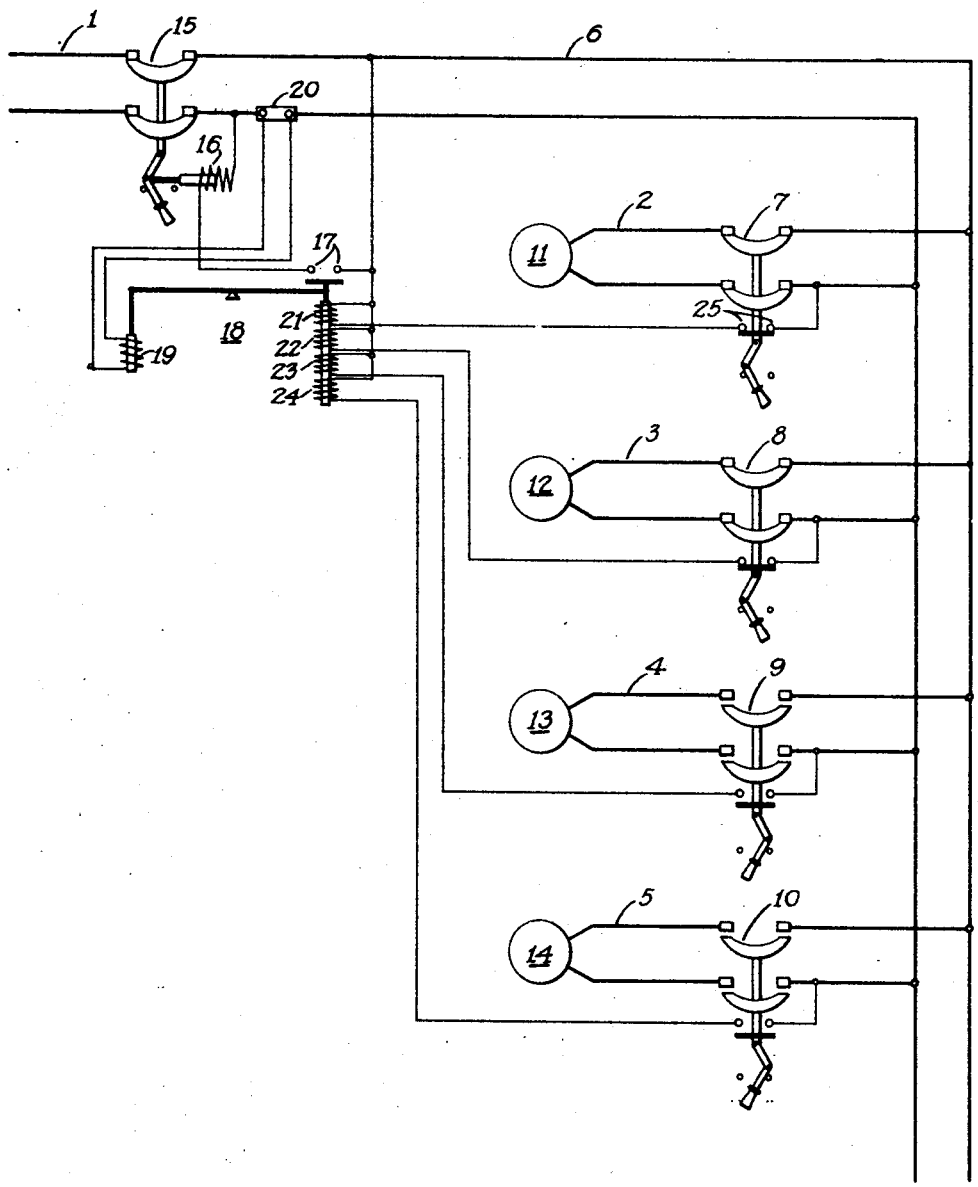
WITNESSES:
INVENTOR
Charles McL. Moss
BY
ATTORNEY Patented May 28, 1929.

1,714,722

UNITED STATES PATENT OFFICE.

CHARLES McL. MOSS, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL DISTRIBUTION SYSTEM.

Application filed January 16, 1924. Serial No. 686,688.

My invention relates to electrical distribution systems and particularly to systems having a distribution circuit and a plurality of supply circuits or vice versa.

The object of my invention is to provide a circuit interrupter for a main circuit which is connected to a plurality of secondary circuits, and that shall be actuated in accordance with the number of secondary circuits that are connected to the main circuit.

My invention comprises, in general, a main circuit including a circuit interrupter having a magnet coil for opening the same, and a plurality of secondary circuits that are adapted to be connected to the main circuit through individual circuit interrupters. Each of these circuit interrupters is provided with a pair of auxiliary contact members which, when engaged, cause a magnet coil to be energized. All of the magnet coils are so disposed in a relay as to tend to counterbalance the effect of an overload coil in the same relay. The overload coil is so connected to a shunt in the main circuit as to cause the relay to effect engagement of a pair of contact members when the current traversing the main circuit exceeds a predetermined value.

The value of this current is determined by the number of circuit interrupters of the secondary circuits that are closed, because for each of these circuit interrupters that is closed, a coil in the relay is energized to tend to counterbalance the effect of the overload coil. When the current traversing the main circuit is sufficient to cause the effect of the overload coil to overcome that of the counterbalancing coils, the contacts of the relay are engaged to energize the tripping coil of the main circuit interrupter and thereby open the interrupter. Thus, the overload setting of the main circuit interrupter is automatically adjusted in accordance with the number of secondary circuits that are connected to the main circuit.

The single figure of the accompanying drawings is a diagrammatic representation of an electrical system in which my invention is embodied.

Referring to the drawing, a main circuit 1 is adapted to be connected to a plurality of secondary circuits 2, 3, 4 and 5 through a circuit interrupter 15, a common portion 6 of the main circuit 1 and a plurality of circuit interrupters 7, 8, 9 and 10, respectively. The secondary circuits 2, 3, 4 and 5 are connected to a plurality of electrical devices 11, 12, 13 and 14, respectively.

My invention is applicable either to a system of this sort in which the main circuit 1 is a distribution circuit, the secondary circuits 2, 3, 4 and 5 are supply circuits and the electrical apparatus 11, 12, 13 and 14 are adapted to supply energy to their respective secondary circuits, or to a system in which the main circuit 1 is a supply circuit, the secondary circuits 2, 3, 4 and 5 are distribution circuits and the electrical apparatus 11, 12, 13 and 14 are adapted to receive energy from their respective secondary circuits.

The circuit interrupter 15 is provided with an operating coil 16 for automatically opening the interrupter under predetermined conditions. The coil 16 is energized from the portion 6 of the circuit 1 through contact members 17 of a relay 18. The relay 18 comprises an overload coil 19 that is connected across a shunt 20 in the common portion 6, and a plurality of coils 21, 22, 23 and 24 that are energized when the circuit interrupters 7, 8, 9 and 10, respectively, are closed.

The relay 18 is of the balanced type and its construction is such that when the overload coil 19 is energized, it tends to cause the contact members 17 to be engaged, while each of the coils 21, 22, 23 and 24, when energized, tend to preclude this operation.

The coil 21 is energized from the common portion 6 of the circuit 1 when the circuit interrupter 7 is closed, by current traversing the circuit extending through a pair of auxiliary contact members 25 of the circuit interrupter 7 that are engaged when this interrupter is closed. In like manner, the coils 22, 23, and 24 are energized when the circuit interrupters 8, 9 and 10, respectively, are closed. Thus, it is obvious that the force counteracting the tendency of the overload coil 19 to actuate the relay 18 to engage the contact members 17 is directly proportional to the number of the circuit interrupters that are closed.

For example, if the circuit interrupters 7 and 8 are closed and the circuit interrupters 9 and 10 are open, as shown in the diagram, the coils 21 and 22 of the relay 18 will be energized from the circuit 1, while the coils 23 and 24 will be de-energized. In order that the relay 18 may effect engagement of the contact members 17, the portion 6 of the circuit 1 must now be traversed by such current as to energize the overload coil 19 sufficiently to overcome the forces exerted because of the energization of the coils 21 and 22.

If all of the circuit interrupters 7, 8, 9 and 10 are closed, then all of the coils 21, 22, 23 and 24 are energized and the overload coil 19 must be energized to substantially double the degree that is required when only two of the coils are energized, supposing these coils to have an equal number of ampere turns. This condition is not required, however, for each of these coils may be provided with the proper number of ampere turns to counteract the force exerted by the energization of the overload coil 19 when the portion 6 of the circuit 1 is traversed by a current of a predetermined value to which it is desired to limit the current traversal of the secondary circuit to which the particular coil corresponds.

In short, my invention may be described as comprising means, such as the relay 18, for controlling the overload setting of the circuit interrupter 15 in accordance with the number of secondary circuits that are connected to the common portion 6 of the main circuit 1 and the connection of each of the secondary circuits may control the energization of a counteracting coil in the relay 18 corresponding to any desired current traversal of the common portion 6.

In view of the foregoing description of a system embodying my invention, the operation of such a system is apparent. Considering the main circuit 1 to be a distribution circuit and the secondary circuits 2, 3, 4 and 5 to be supply circuits, it is desired to automatically adjust the overload setting of the circuit interrupter 15 to disconnect the distribution circuit 1 from the common portion 6 thereof when the current traversing the portion 6 exceeds a predetermined value. This maximum value of current that is permissible in the portion 6 is dependent upon the number of the supply circuits 2, 3, 4 and 5 that are supplying energy to the distribution circuit 1 therethrough.

When two of the supply circuits are connected to the common portion 6 through their respective circuit interrupters, two of coils 21, 22, 23 and 24 are energized and the current traversing the shunt 20 in the portion 6 that will energize the overload coil 19 of the relay 18 sufficiently to effect engagement of the contact members 17, is proportional to the number of circuits. Likewise, when three of the supply circuits are connected to the common portion 6, three of the coils 21, 22, 23 and 24 are energized and the value of current traversing the portion 6 that will cause the circuit interrupter 15 to be opened is a value substantially fifty per cent greater than the value previously required, provided all of the coils 21, 22, 23 and 24 have equal numbers of ampere turns.

It is, therefore, obvious that the overload setting of the circuit interrupter 15 is directly governed by the number of supply circuits that are connected to the common portion 6. The operation of the system is identical if the main circuit 1 is considered to be a supply circuit and the secondary circuits 2, 3, 4 and 5 to be distribution circuits.

It will be understood that the system embodying my invention is not limited to the specific details of construction and connections that have been described in the foregoing specification, as many changes and modifications may be made therein without departing from the spirit and scope of my invention, as set forth in the appended claims.

I claim as my invention:

1. The combination with a main circuit, a circuit interrupter therein, a magnet coil for opening the circuit interrupter when the coil is energized, a plurality of secondary circuits, a circuit interrupter connected between each secondary circuit and the main circuit, and a relay responsive to the amount of current traversing the main circuit for controlling the energization of the coil for opening the circuit interrupter in the main circuit, of means responsive to the number of closed circuit interrupters of the secondary circuits for controlling the effectiveness of the relay.

2. The combination with a main electric circuit, a plurality of secondary circuits adapted to be connected thereto, and an overload relay associated with the main circuit, of means for automatically varying the setting of the relay in accordance with the number of secondary circuits that are connected to the main circuit.

3. The combination with a distribution circuit, a plurality of supply circuits, and an overload relay associated with the distribution circuit, of means for automatically varying the setting of the relay in accordance with the amount of energy available in the supply circuits.

In testimony whereof, I have hereunto subscribed my name this 8th day of January, 1924.

CHARLES McL. MOSS.